Patented Feb. 5, 1952

2,584,123

UNITED STATES PATENT OFFICE 2,584,123

DISPERSING AND EMULSIFYING COMPOSITIONS

Louis A. Gruenwald, New York, N. Y.

No Drawing. Application August 6, 1948,
Serial No. 42,997

8 Claims. (Cl. 106—142)

As conducive to a clear understanding of the present invention, it is noted that where a paint or varnish base or a resin base of the cellulose ester or other type with or without pigment or other coloring material is combined in the presence of various familiar types of emulsifying agents or protective colloids with water or oil to produce the completed coating composition, difficulties commonly are encountered in practice, among which are the following:

(a) The need for elaborate comminuting mechanisms such as colloid mills or homogenizers, (b) The tendency to break the emulsion by freezing of the substantial water content during storage in cold weather, a difficulty occurring not only where there must be more than 50 per cent of water, but even where as little as 10 per cent is sufficient, (c) The formation of a skin when large amounts of driers are used. It is noted that the expedient of adding anti-oxidizing agents to the driers to mitigate the skinning would retard the drying and, therefore, offset the very purpose for which driers are added, (d) Low durability and poor water resistance due to the tendency for the oil coated pigment particles of the emulsified coating composition to migrate from the oil into the water phase, so that the bonding action of the film forming constituent upon the dispersed pigment is reduced and much of the pigment is exposed to weathering upon the evaporation of water and is, therefore, subject to oxidation and to being washed out of the film.

(e) Frequently certain film formers such as cellulose esters remain too viscous for convenient application to the surface to be coated even when extended to the utmost practical degree by the addition of solvents.

It is among the objects of the present invention to provide a relatively inexpensive emulsifying and dispersing agent which when added to otherwise conventional paint or varnish bases will completely obviate all of the foregoing difficulties and in particular will have the following characteristics and advantages:

(a) Dispensing with the need for colloid mills or homogenizers or other mechanical means for dispersing the pigment particles;

(b) Dispensing with the need for substantial proportions of water in the coating composition as marketed and hence reducing storage space and weight and precluding breakage of the emulsion due to freezing of water, the composition remaining stable though stored for long periods even under extreme conditions of heat or cold, because in practice the water need not be added to the composition until the latter is about to be applied to the surface to be coated;

(c) Inherent inactivation (even in the absence of anti-oxidizing agents) of any driers used, with the automatic evolution of the full effectiveness of the drier, once the coating composition has been applied to the surface to be covered, (d) Formation of a film which permanently retains the oil coated pigment particles in the oil phase without migration thereof into the water phase and hence is thoroughly water resistant and durable, (e) Capability of extending the relatively non-aqueous emulsifiable coating composition regardless of its constitution by merely adding any desired proportion of water, kerosene or other extender, with assurance in every case of complete dispersion or complete dual emulsion of both oil-in-water and water-in-oil.

The most satisfactory composition according to the present invention includes:

| | Preferred | Range |
|---|---|---|
| (a) proteinaceous material | 90 | 65 to 105. |
| (b) aliphatic or cyclic nitrogeneous compound | 170 | 100 to 250. |
| (c) drying oil or fatty acid thereof | 325 | 0 to 500. | all in parts by weight.

The nitrogeneous compound is preferably an amine or mixture of amines having a vapor pressure of between 4.0 and 11.0 or desirably between 5.0 and 10.0 or a vapor pressure between 100° C. to 200° C. and preferably between 130° C. and 190° C. The desired composition is a combination of a morpholine and an alkanolamine having boiling points below 180° C. Polyalkylene polyamines may also be included such as:

| | |
|---|---|
| ethylene | diamine |
| diethylene | triamine |
| triethylene | tetramine |
| tetraethylene | pentamine |
| propylene | diamine |

The dispersing and emulsifying agent of the present invention preferably includes as (fundamental) ingredients proteinaceous material, aliphatic amino alcohol, cyclic amino ether and drying oil fatty acid or ester.

Any proteinaceous material such as albumen or prolamine will serve, but the best results are attained with the use of scleroproteins or phosphoproteids.

Among the proteins which may be employed are:

egg albumen
blood protein
zein
gliadin
casein
collagen
elastin
proteoses

The amino alcohol used is preferably of the branched aliphatic type, desirably a primary amino-alkyl-substituted alcohol, characterized by relatively high vapor pressure and by inherent wetting out properties. The alkyl group on the side chain enhances solubility in the oil phase without interfering with solubility in the water phase imparted by the hydroxyl and amino groups. A preferred amino alcohol is amino propanol, specifically 2 methyl, 2 amino-propanol. Other alcohols which may be employed, such as:

2-ethyl, 2-aminopropanol.
2-amino, 2-ethyl-1,3-propane diol.
monoethanolamine.
2-amino, 1-ethanol.
isopropylamine.
diethylaminoethanol.
mono-isopropanolamine.
di-isopropanolamine.

The cyclic amino ether ingredient preferably consists of morpholine which is characterised by solubility in both oil and water, by high solvent power due to the ether group and by a very high vapor pressure.

Instead of morpholine it is possible to use:
morpholine ethanol.
morpholine methanol.
methyl morpholine.
ethyl morpholine.
propyl morpholine.
phenyl morpholine.
morpholine ethanol ethyl ether.

The combined nitrogeneous compounds should at all times give a vapor pressure of between 6.0 to 9.5. The aminoalcohol should not have more than 10 nor less than 3 carbon atoms and preferably should have one to three amino groups and one hydroxy group.

The drying oil fatty acid or ester ingredient is identified briefly in the claims as "drying oil." The oil of the unsaturated type, orients more readily to the water phase and in its most satisfactory embodiment, an oil is used that has conjugated double bonds which contributes to ease of emulsification, linolenic acid being an example.

Desirably but not indispensably the dispersing and emulsifying agent may have a further ingredient comprising a cyclic amine, preferably pyridine, which is characterized by being both oil and water soluble and constitutes a good wetting or penetrating agent, which serves to improve the adhesion of ready mixed paints, especially to metal and to textile surfaces.

A desirable illustrative formula of the dispersing and emulsifying agent consists of the following:

Keratin _____ lbs__ 65 to 105.
Amino-Methyl-Propanol _____ lbs__ 140 to 208.
Morpholine _____ lbs__ 140 to 208.
Linolenic acid _____ lbs__ 250 to 400.

to which desirably may be added pyridine 5 to 35 lbs.

When there is relatively little water to be used in the dual emulsion, lesser amounts of protein, down to as little as 25 pounds may be used. When there is relatively little oil to be used in the dual emulsion, the content of morpholine or of the aliphatic amino alcohol or of each may be as little as 60 pounds.

The dispersing and emulsifying agent is prepared by cooking the protein in a water dispersion under a moderate vacuum and temperature for a period of hours in the presence of small quantities of amino alcohol such as amino-methyl-propanol or cyclic amino ether such as morpholine. Preferably only a small amount of the amine is used at this step to avoid too far going hydrolytic degradation of the protein to amino acids, under the moderate alkalinity of the amine; for it is highly desirable to take advantage of the film forming characteristics inherent in the big undegraded protein molecule.

While the temperature, vacuum and time may vary somewhat for different proteins, keratin would be treated by cooking for 1 to 6 hours under a vacuum of 10 to 15 inches at a temperature of 60 to 90 degrees F.

After the cooking operation set forth, the balance of the aliphatic alcohol and the cyclic ether employed are added without further external heat application and thereafter the drying fatty acid ingredient is added.

The dispersing and emulsifying agent of the present invention is simply admixed in proportions of .5 to 25 per cent preferably .5 per cent to 5 per cent by weight of the film forming coating composition such as resin base varnish resinous solution, cellulose ester or the like, clear or pigmented or otherwise colored and no homogenizer or colloid mill is required for the purpose, except under unusual circumstances, as for instance, with the use of vehicles having high melting points.

Where substantially only water-in-oil emulsion is desired, as for instance, in adhesives, primers or fast breaking emulsions, the lower proportion (as little as .5 per cent) of the emulsifier would be used. Where, on the other hand, substantially only oil-in-water emulsion is desired, as for instance, for spraying-paint and treatment of textiles for permanent finish, the higher proportion (as high as 25 per cent) of the emulsifier would be used. For intermediate proportions of emulsifier, (say from 2 per cent to 10 per cent,) a dual emulsion is attainable, which may be extended with oil or water or both. Where the vehicle base is fish oil, for instance, 2 per cent of the emulsifier may be sufficient, while with terpene resin vehicle base, substantially more emulsifier would be used to attain dual emulsion.

Typical formulas for coating compositions are by weight:

For a red paint:

Red pigment _____ parts__ 40
Yellow pigment _____ do____ 140
Blue paste _____ do____ 10
Clay _____ do____ 240
Phenolic varnish with 50%
  solvent _____ do____ 550
Emulsifying agent of the
  present invention _____ do____ 68

For a white paint:

Titanium dioxide _____ parts__ 300
Clay _____ do____ 300
Ester Gum Varnish Base _____ do____ 190
Solvent _____ do____ 300
Emulsifying agent of the
  present invention _____ do____ 88

For a dark green paint:

| | | |
|---|---|---|
| Blue paste | parts | 29 |
| Lemon yellow pigment | do | 50 |
| Dark yellow pigment | do | 15 |
| Chrome dioxide | do | 200 |
| Clay | do | 300 |
| Glyptal varnish with 50 per cent solvent | do | 550 |
| Emulsifying agent of the present invention | do | 55 |

For a light green paint:

| | | |
|---|---|---|
| Titanium dioxide | parts | 165 |
| Yellow pigment | do | 70 |
| Red pigment | do | 15 |
| Blue paste | do | 10 |
| Clay | do | 275 |
| Linseed oil varnish base | do | 600 |
| Emulsifying agent of the present invention | do | 70 |

Various vinyl, acrylic, phenolic, urea, polyethylene, and other resins may be employed as the base of the above paints or varnishes instead of or together with the ester gum.

In a preferred use, white pigment such as titanium oxide, zinc oxide or lead sulphate is distributed in the oil base vehicle, and where this is of the varnish type, drier is also included, all with a minimum of water. To prepare coating compositions of any desired color, the coloring matter ground in oil need merely be stirred in, the dispersing and emulsifying ingredient of the present invention assuring adequate dispersion. The mix regardless how it is formulated may be extended by the mere addition thereto of water, kerosene, gasoline or other solvent as desired to the required viscosity for application. The dispersing and emulsifying complex of the present invention assures a stable dispersion or emulsion. The emulsion is of a dual character both oil-in-water and water-in-oil and will not be broken in use.

An explanation for the surprising efficacy of my dispersing and emulsifying agent will now be briefly set forth, although it is distinctly to be understood that such explanation is largely tentative and not necessarily complete or correct in all particulars.

The morpholine ingredient partaking as it does of the properties of both ethers and amines, apparently enters into three combinations with the fatty and the amino acids used, namely, firstly it forms soluble complexes therewith in the general manner set forth in the copending application, Serial No. 324,649, filed March 18th, 1940, now Patent No. 2,374,678, dated May 1, 1945, secondly, it forms loose amino salt complexes therewith, and thirdly, addition compounds are formed at the ether group of the morpholine.

The combination of the morpholine with the fatty and amino acids to form complexes, salts and addition products contributes greatly to the emulsification and upon passing off of the morpholine in drying of the coating a film is formed by the operation set forth in the copending application above identified.

Part of the amines combines with the pigment employed, such as iron or chrome pigments to form weak complexes therewith and to promote dispersion thereof.

The excess of the amines, i. e. so much thereof as does not combine chemically with the amino acids or with the drying oil fatty acid and with the pigment is absorbed on the surface of that part of the protenaceous material which remained unchanged and was not degraded to amino acids in the cooking operation above set forth.

Thus, the agent of the present invention affords a very effective emulsifying nucleus which maintains the pigment particles thoroughly dispersed.

The soluble complexes of fatty and amino acids formed with the morpholine readily decompose upon passing off of the morpholine component during outdoor exposure, to leave the desired film in the general manner set forth in the prior application above identified.

The agent of the present invention inherently maintains the small particle side of the pigment even though of high concentration and in spite of the use of inerts and much water in the coating composition, the continuity and gloss of the pigment in the resultant dry painted surface is nevertheless very satisfactory.

By reason of its high vapor pressure the morpholine in some cases may lead to blushing, that is, to forming a grey haze within the film due to locking in of the water particles. The aliphatic amino alcohol ingredient avoids this difficulty by enhancing the wetting out properties, but though its vapor pressure is much lower than that of morpholine, it passes off nevertheless in drying, by being entrained with the morpholine by reason of the very high vapor pressure of the latter.

This application is a continuation-in-part of application Ser. No. 501,162 filed September 3, 1943, now abandoned.

As many changes could be made in the above process, and many apparently widely different embodiments of this invention could be made without departing from the scope of the claims, it is intended that all matter contained in the above description shall be interpreted as illustrative and not in a limiting sense.

Having thus described my invention what I claim as new and desire to secure by Letters Patent of the United States is:

1. A dispersing and emulsifying agent consisting of a complex of the following materials in the following proportions:

| | | |
|---|---|---|
| Partially hydrolyzed keratin | lbs | 65 to 105 |
| 2-methyl 2-amino propanol | lbs | 140 to 208 |
| Morpholine | lbs | 140 to 208 |
| Pyridine | lbs | 5 to 35 |
| Linolenic acid | lbs | 250 to 400 |

2. An aqueous dispersing and emulsifying agent comprising a protein selected from the group consisting of scleroproteins and phosphoproteids, a low alkyl amino propanol, morpholine and an unsaturated drying oil fatty acid, said propanol and morpholine being present in sufficient amount to cause partial hydrolysis of the protein and said unsaturated drying oil fatty acid forming a complex with the protein upon drying.

3. An aqueous dispersing and emulsifying agent comprising protein selected from the group consisting of scleroproteins and phosphoproteids, methyl amino-propanol, morpholine and an unsaturated drying oil fatty acid, said propanol and morpholine being present in sufficient amount to cause partial hydrolysis of the protein and said unsaturated drying oil fatty acid forming a complex with a protein upon drying.

4. The process of preparing a dispersing and emulsifying agent which comprises cooking a protein selected from the group consisting of scleroproteins and phosphoproteids in aqueous dispersion under partial vacuum in the presence of an alkaline agent selected from the group consisting of methyl amino alkanol and morpholine for partial hydrolization only, then adding an excess of the amino propanol and morpholine and also an unsaturated drying oil fatty acid.

5. An aqueous dispersing and emulsifying agent comprising morpholine, a protein selected from the group consisting of scleroproteins and phosphoproteids, a low molecular weight alkyl amino porpanol in sufficient quantity to cause partial hydrolysis of the protein and drying oil fatty acid to form a complex with the protein on drying 6. An aqueous dispersing and emulsifying agent comprising an amino-alcohol, protein selected from the group consisting of scleroproteins and phosphoproteids, morpholine in sufficient quantity to cause partial hydrolysis of the protein and a drying oil fatty acid to form a complex with the protein on drying.

7. The process of preparing an aqueous dispersing and emulsifying agent for use in ready mixed paints which comprises cooking a protein selected from the group consisting of scleroproteins and phosphoproteids, in aqueous dispersion under partial vacuum in the presence of sufficient morpholine to cause partial hydrolization of the protein, then adding an excess of the morpholine and also an amino-alcohol and an unsaturated drying oil fatty acid to form a complex with the protein upon drying.

8. The process of preparing an aqueous dispersing and emulsifying agent for use in ready mixed paints which comprises cooking a protein in aqueous dispersion under partial vacuum in the presence of sufficient methyl amino propanol for partial hydrolization of the protein, then adding an excess of the amino propanol, morpholine and also an unsaturated drying oil fatty acid to form a complex with the protein upon drying.

LOUIS A. GRUENWALD.

REFERENCES CITED

The following references are of record in the file of this patent:

UNITED STATES PATENTS

| Number | Name | Date |
|---|---|---|
| 1,946,159 | Graenacher | Feb. 6, 1934 |
| 2,190,705 | Dreyling | Aug. 15, 1935 |
| 2,206,090 | Haggenmacher | July 2, 1940 |
| 2,233,891 | Kratz | Mar. 4, 1941 |
| 2,234,934 | Steinle et al. | Mar. 11, 1941 |
| 2,320,087 | Lee | May 25, 1943 |